(12) United States Patent
Burgholz et al.

(10) Patent No.: US 12,460,629 B2
(45) Date of Patent: Nov. 4, 2025

(54) METHOD AND APPARATUS FOR THE PRESERVATION OF BEVERAGES WITH PUMP VENTING

(71) Applicant: LANXESS DEUTSCHLAND GMBH, Cologne (DE)

(72) Inventors: Jonas Burgholz, Cologne (DE); Erasmus Vogl, Cologne (DE); Gerhard Sartorius, Cologne (DE); Axel Kubatz, Cologne (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 0 days.

(21) Appl. No.: 18/562,872

(22) PCT Filed: May 24, 2022

(86) PCT No.: PCT/EP2022/064128
§ 371 (c)(1),
(2) Date: Nov. 21, 2023

(87) PCT Pub. No.: WO2022/248514
PCT Pub. Date: Dec. 1, 2022

(65) Prior Publication Data
US 2024/0218869 A1    Jul. 4, 2024

(30) Foreign Application Priority Data
May 26, 2021   (EP) .................................. 21175892

(51) Int. Cl.
*F04B 49/22*   (2006.01)
*A23B 2/00*    (2025.01)
(Continued)

(52) U.S. Cl.
CPC .............. *F04B 49/22* (2013.01); *A23B 2/003* (2025.01); *A23B 2/792* (2025.01); *F04B 49/06* (2013.01); *F04B 53/06* (2013.01); *F04B 2205/09* (2013.01)

(58) Field of Classification Search
CPC .......... F04B 49/22; F04B 49/06; F04B 53/06; F04B 2205/09; A23B 2/792; A23B 2/003
See application file for complete search history.

(56) References Cited

U.S. PATENT DOCUMENTS 5,417,663 A * 5/1995 Slettenmark ...... A61M 5/14276
604/126
6,065,940 A    5/2000 Fleischer et al.
(Continued)

FOREIGN PATENT DOCUMENTS

DE    71 07 859 U    7/1971
DE    36 31 984 C1   12/1987
(Continued)

OTHER PUBLICATIONS

English Translation of DE202014010823A1 obtained Jan. 13, 2025 (Year: 2014).*
(Continued)

*Primary Examiner* — Connor J Tremarche
(74) *Attorney, Agent, or Firm* — Schmeiser, Olsen & Watts, LLP

(57) ABSTRACT

A device for preserving beverages with a measuring device, is provided which is suitable and intended to determine a flow rate of a liquid flowing through a beverage line, and with a pump device which conveys a preservative, in particular dialkyl dicarbonate, into the beverage line, into the beverage line, the pump device being controllable as a function of a flow rate determined by the measuring device,
(Continued)

Figure 1:
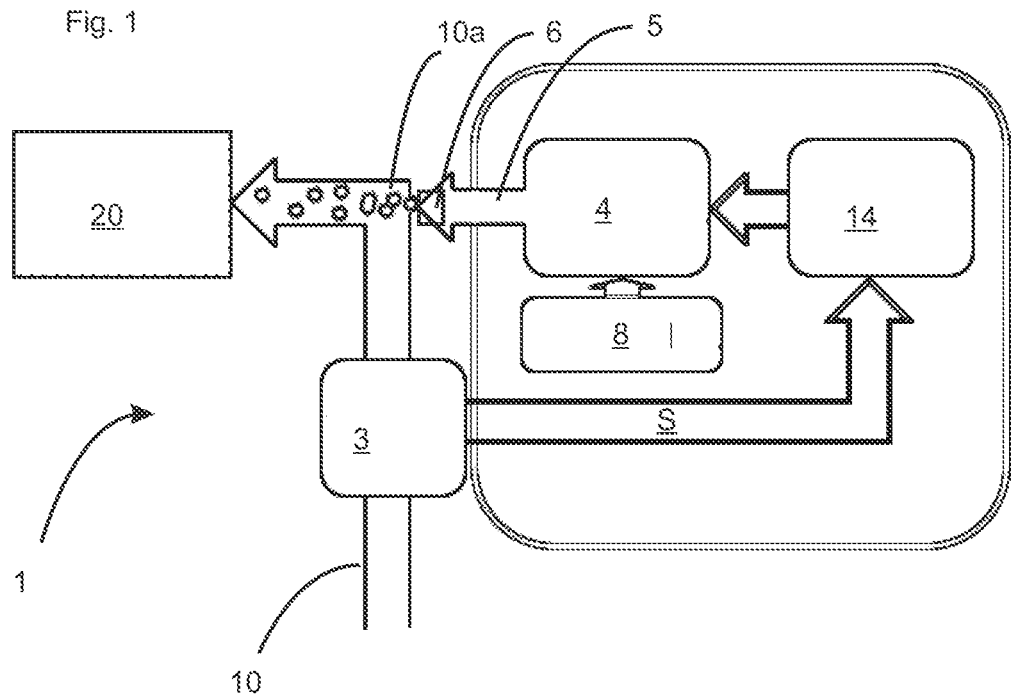

the device having a venting device for venting the pump device, wherein the venting device has a valve device.

20 Claims, 1 Drawing Sheet

(51) Int. Cl.
*A23B 2/792* (2025.01)
*A23L 3/00* (2006.01)
*A23L 3/3589* (2006.01)
*F04B 49/06* (2006.01)
*F04B 53/06* (2006.01)

(56) References Cited

U.S. PATENT DOCUMENTS

| | | | |
|---|---|---|---|
| 2018/0035696 A1* | 2/2018 | Bartlett | A23B 2/725 |
| 2019/0328170 A1* | 10/2019 | Cai | A47J 31/407 |
| 2024/0180205 A1* | 6/2024 | Vogl | A23B 70/10 |
| 2024/0218869 A1* | 7/2024 | Burgholz | F04B 53/06 |
| 2025/0008989 A1* | 1/2025 | Sartorius | A23B 2/758 |

FOREIGN PATENT DOCUMENTS

| | | | | |
|---|---|---|---|---|
| DE | 202008001131 U1 * | 5/2008 | | F04B 43/0081 |
| DE | 102014010823 A1 * | 2/2016 | | A47J 31/402 |
| EP | 0 968 370 B1 | 12/2001 | | |
| EP | 2 241 200 A1 | 10/2010 | | |
| EP | 2013160 B1 | 7/2012 | | |
| EP | 2016041 B1 | 8/2013 | | |
| WO | 1998042983 A1 | 10/1998 | | |
| WO | WO-2009043715 A1 * | 4/2009 | | A23L 2/44 |

OTHER PUBLICATIONS

English Translation of DE202008001131U1 obtained Jan. 13, 2025 (Year: 2008).*
English Translation of WO2009043715 obtained Jan. 13, 2025 (Year: 2009).*
International Search Report for PCT/EP2022/064128 mailed on Sep. 13, 2022.
Nongfu Spring—Operation Specifications and Precautions for Vitamin C, published Aug. 6, 2013, 11 pages (English Trasnlation).

* cited by examiner

METHOD AND APPARATUS FOR THE PRESERVATION OF BEVERAGES WITH PUMP VENTING

CROSS-REFERENCE TO RELATED APPLICATIONS

This application claims priority to PCT Application No. PCT/EP2022/064128, having a filing date of May 24, 2022, based on EP Application No. 21175892.5, having a filing date of May 26, 2021, the entire contents both of which are hereby incorporated by reference.

FIELD OF TECHNOLOGY

The following relates to a method and an apparatus for preserving beverages and the use of the apparatus for this purpose.

BACKGROUND

Preservatives such as dialkyl dicarbonates, sulphur dioxide, natamycin, benzoates or sorbates are used in the beverage industry for cold sterilization of non-alcoholic carbonated or still fruit juice drinks, fruit juices, wines, non-alcoholic wines, ciders, iced teas and other beverages. Dialkyl dicarbonates, such as dimethyldicarbonate or diethyldicarbonate in particular, represent a special cold sterilizing agent that has a number of advantages. The outstanding advantage lies in the fact that taste and color are not affected, in contrast to hot filling. Also compared to persistent preservatives, such as sodium benzoate or benzoic acid or potassium sorbate or sorbic acid, the advantage is in particular the absence of any taste impairment and the disappearance of the effect. Due to the decomposition of the dialkyl dicarbonates into harmless components, no preservative is consumed by the actual consumer.

Compared to cold aseptic filling, the advantage of using dialkyl dicarbonates is the significantly lower investment costs in plant technology.

According to the state of the conventional art, only on-line diaphragm dosing pumps are used for the addition of dialkyl dicarbonates. This is necessary because the amount of beverage to be treated is not fixed from the outset. One advantage of diaphragm pumps is that their pumping chamber is completely enclosed.

Diaphragm pump apparatus usually consists of a magnetically or electrically driven diaphragm pump, storage vessels, a device attached to the beverage line for atomizing the dialkyl dicarbonate, a flow meter attached to the beverage line, and an electronic control system. Dosing pumps of this type are usually permanently installed in the beverage line.

The dosing pumps should be suitable for several different performance parameters, in particular for small and very small quantities. In addition, these dosing pumps should have a high dosing accuracy, a high atomization pressure and a wide control range.

The mode of operation of these devices is based on the on-line measurement of the beverage flow rate prevailing in the beverage pipe and the quantity of dialkyl dicarbonate to be dosed calculated in parallel. Dialkyl dicarbonate is thus proportionally dosed into the beverage tube in the required quantity. Examples of these pumps are the VelcorinDT units from Lanxess.

In the treatment of beverages, for example non-alcoholic soft drinks or wine or mixed beer beverages, cold sterile treatment with dialkyl dicarbonates may be necessary, for example to control bacteria or yeasts. The aforementioned dosing devices are therefore used for treatment.

A dosing pump for the metered delivery of liquids is known from WO1998042983A1.

The dosing pumps used for such apparatuses and methods must fulfil different performance parameters. On the one hand, they should be suitable for feeding small or very small quantities. In addition, these dosing pumps should have a high accuracy, but at the same time also provide a high atomization pressure and have a wide control range, in particular for the most diverse applications.

However, it has been shown that the preservatives used outgas to a certain extent. The pumps used in the state of the conventional art react sensitively to outgassing media, which can lead to large dosing fluctuations or even a functional failure.

SUMMARY

An apparatus for preserving beverages according to embodiments of the invention has a measuring device which is suitable and intended for determining a flow rate of a liquid flowing through a beverage line, and a pump device which conveys a preservative, in particular dialkyl dicarbonate, into the beverage line, and wherein the pump device can be controlled as a function of a flow rate determined by the measuring device.

According to embodiments of the invention, the apparatus comprises a venting or degassing device for venting the pump device and this venting device comprises a valve device.

Embodiments of the invention described here serve in particular to take precautions to realize the dosing process as far as possible free of gas and in particular to safely remove gas bubbles from the pump device.

In an embodiment, the apparatus has a delivery line which opens into the beverage line and the pump device delivers the preservative through this delivery line.

In the following, the term "venting" is used for simplification, even if the medium to be discharged is a gas other than air. In an embodiment, the gases are gases selected from a group of gases containing $CO_2$, methanol, methyl carbonate and dimethyl carbonate.

In a further embodiment, the apparatus has a nozzle device and, in particular, a nozzle head which injects the preservative into the beverage line and/or atomizes the preservative in the beverage line and/or in the beverage. This nozzle device or this nozzle head projects into the beverage line at least in sections.

In an embodiment, the nozzle device or the nozzle head is a component of the delivery line and in particular forms an end of this delivery line.

In an embodiment, therefore, the pump device serves to inject the preservative into the beverage line and/or into the beverage. In an embodiment, the pump device is a pump device which is suitable and intended to convey a medium, such as the preservative in this case, under pressure and/or a pump device which is suitable and intended to cause atomization of the preservative in the beverage line.

In an embodiment, the valve device is a controlled valve device. A controlled valve device is understood to be a (particularly active) valve device which can be actively actuated by a control process and which, in particular, does not open due to an overpressure or a flow movement, such as a non-return valve.

Embodiments of the invention thus describe an apparatus and a method for pump venting and in particular for pump head venting and in particular for fully automatic pump head venting. In addition, as described in detail below, a manual intervention option and/or an intervention option by a user is also to be provided.

In an embodiment, the pump device is a dosing pump and in particular a diaphragm pump or a diaphragm dosing pump. Diaphragm pumps have proven to be suitable pumping devices to fulfil the criteria described above.

In an embodiment, this pump device has a flow rate that is greater than 0.01 l/h and desirably greater than 0.02 l/h. In an embodiment, the pump device has a flow rate that is less than 60 l/h, desirably less than 50 l/h, desirably less than 40 l/h, desirably less than 30 l/h and desirably less than up to 20 l/h.

In an embodiment, the pump device can be controlled in a power range in which the ratio between the lowest flow rate and the highest flow rate is less than 0.1, desirably less than 0.01. In this way, a wide variety of requirements for the filling of beverages can be met with a single type of pump.

In an embodiment, the pump device delivers the preservative under pressure to a nozzle device, and under a pressure that is between 5 bar and 100 bar, desirably between 15 bar and 50 bar.

In an embodiment, the beverage is conveyed through the beverage line with a flow rate of 40 l/h-80000 l/h.

In an embodiment, the valve device described above serves to vent a pump head of the pump device and/or a predetermined area of the pump device in which outgassing media can collect and/or which forces the medium to be dosed in the direction of the beverage line. The pump head is sometimes also called dosing head or delivery unit in the literature. In particular, it is the area through which the medium to be conveyed flows (is sucked in and/or conveyed). In an embodiment, the pump head is limited by a suction valve, a pressure valve and a delivery element (such as a membrane of a piston or the like). Thus, the pump head could also be called a "dosing device".

In a further embodiment, the valve device is a solenoid valve. Solenoid valves or solenoid-controlled valves have the advantage that they can be switched very quickly and also at very high cycle speeds.

In a further embodiment, the apparatus has a control device for controlling the valve device and in particular the valve device designed as a solenoid valve. In particular, this control device is suitable for cyclically controlling the solenoid valve.

In an embodiment, the control device is suitable and intended to control the valve device in response to or in consideration of a (delivery) movement of the pump device and in particular a pump stroke. For example, the solenoid valve can be controlled cyclically with every nth pump stroke (where n is a natural number).

For example, the valve device can be controlled taking into account a position of an element of the pump device, for example taking into account the position of a pump piston, a diaphragm of a diaphragm pump or a position of a valve of the pump device (in particular if the pump device is a diaphragm pump). In an embodiment, a detection device is provided which detects this position. However, it would also be possible to obtain this data from a pump control.

Furthermore, as described in detail below, the control device is suitable and intended to control the valve device also depending on different operating modes of the apparatus. For example, it is possible that in a dosing mode, the valve device is opened cyclically in order to safely expel gas bubbles that arise in this dosing mode. The more detailed procedures are described below. This cyclical opening of the valve device is adapted to the pump cycle of the pump device.

In a further embodiment, the apparatus has a monitoring device for monitoring the venting process. In this way, it can always be monitored, even during operation, whether and to what extent venting is being carried out or may be necessary. The control of the valve can be adapted to this monitoring.

In an embodiment, the valve device can also be actuated manually and/or by user intervention. For example, manual actuation of the valve device is also possible. In this way, for example, emergency actuation or emergency venting is possible. Thus, it is possible that a user directly actuates the valve device. However, it would also be possible for the user to actuate the valve device by means of a control device.

In an embodiment, the valve device is a screw-in valve, i.e., a valve that can be screwed into a specific area of the pump device. In an embodiment, the valve device is a two-way valve.

It would be possible to arrange the valve for venting at different positions, for example also between the pump head and the nozzle device. However, in particular in a setup with a directly attached nozzle, an installation at the highest point in the pump head is desirable.

In an embodiment, the valve device has a seat seal and in particular a soft-seat seal. In addition, the valve device is designed with a low dead space.

This design has the (constructive) advantage that the valve inner volume (i.e., the part in contact with the medium) is as small as possible. In this way it is achieved that the efficiency of the pump device and the dosing accuracy are not influenced too much.

It is thus achieved that the pumps have a very small "damage space" between the diaphragm and the nozzle. In this way, accuracy and reliability (in particular in connection with venting) can be improved.

In a further embodiment, the valve device is arranged in a region of the pump device and, in particular, of a product chamber of the pump device, and/or the valve device is arranged (in relation to the medium to be conveyed) in an upper and, in particular, a highest region of the pump device and/or of the product chamber. The highest area is understood to be an area that is arranged highest in a vertical direction or in a direction directed towards the center of the earth in comparison to other areas. In an embodiment, the valve device is arranged in such a way that a gaseous medium can collect in a region of the valve device.

In this way, venting of the pump device is possible in a particularly favorable manner. In particular, gas bubbles can be removed or discharged from the pump device in a particularly favorable manner.

In a further embodiment, a line for conducting venting gases and/or a liquid (and in particular the liquid to be conveyed) is connected to the valve device (and in particular to an outlet of the valve device). In principle, it would also be possible to carry out the venting into the environment. However, especially with regard to the preservation agents, it is suggested that these are recirculated. In this case, it is possible that both gases and liquid are discharged during the venting process. For this reason, the line serves to feed these media at least partially, and in particular the liquid media, back into a circuit and/or back to the pump device. As will be described in more detail below, the discharged gas and/or liquid can be fed into a vessel via this line.

In a further embodiment, the apparatus has a measuring vessel and/or a measuring device for detecting a level of a liquid and/or gaseous medium and the line described above opens into this measuring vessel. The measuring vessel may, for example, be a measuring burette, i.e., a vessel which has a measuring scale. In general, in the context of embodiments of the present invention, a measuring vessel is understood to be a device which has a receiving volume for receiving a liquid medium and which, in addition, enables this volume to be determined. A measuring vessel can also allow liquid to pass through it.

In a further embodiment, the apparatus has a receiving chamber for at least temporarily receiving a liquid medium discharged from the pump device via the valve device. This receiving chamber is in flow connection with the above-described line which is connected to the valve device. This receiving chamber is formed by the measuring vessel described above.

In an embodiment, the discharged gas or liquid quantity is conveyed via a line into a calibration vessel or measuring vessel on the suction side. In an embodiment, this measuring vessel is designed in such a way that a gas phase can escape, and a liquid phase is or can be fed again into the process and/or the pump device.

In an embodiment, therefore, the apparatus and in particular the measuring vessel has a separating device in order to be able to separate gaseous and liquid components of the medium escaping via the venting valve. This separating device can also be formed by the shape of the measuring vessel itself.

In an embodiment, the measuring vessel has a filling level measuring device. In an embodiment, this measuring vessel has a floating device, in particular for level measurement. However, other sensors are also possible which are suitable and intended for determining the filling level within a measuring vessel.

In a further embodiment, the apparatus has an evaluation device for evaluating and/or determining the filling level (of the measuring vessel). For example, an image recording device such as a camera can be used, which monitors the filling level inside the measuring vessel. This filling level measuring device can also output data which can be used to control the pump device and/or the valve device.

In a further embodiment, the apparatus has a sensor device that detects at least one parameter that is characteristic of the substance or media passed on from the valve device. For example, a flow measuring device can be provided in the line connecting to the valve device in order to determine the gaseous and/or liquid medium flowing in the line with regard to its flow rate.

In addition, a measuring device can also be provided which outputs a parameter that is characteristic of whether the escaping medium is a gaseous or a liquid medium.

In an embodiment, a temperature sensor can be used here (as a measuring device or sensor device). In an embodiment, this temperature sensor is kept at a suitable temperature (in particular electronically controlled). As soon as liquid medium is passed on from the valve device and meets the temperature sensor, the temperature of the sensor changes, because the temperature of the liquid is somewhat lower than that of the sensor. The temperature sensor can thus provide a signal for the control system to detect the back-flowing medium.

However, other measuring methods could also be considered, such as ultrasonic measurement or mass flow detection. However, a calorimetric method for flow detection is desired, as described.

Based on the measured values of this sensor device, it can be determined whether gas is escaping from the pump or whether liquid is already escaping.

In an embodiment, a sensor device is thus provided and, in particular, a sensor device is installed in the said line which monitors the venting function. As long as, for example, a gas flows past the sensor device, the venting process is to be continued. If liquid flows along the sensor device, the venting is successfully completed.

In a further embodiment, the measuring vessel has an inlet for a liquid and/or an outlet for a liquid, wherein this outlet being in flow connection with the pump device. In an embodiment, the measuring vessel also has a discharge device for discharging a gaseous medium. This discharge device can have a filter device for filtering the medium to be discharged.

The measuring vessel or measuring burette on the suction side has a float, as mentioned above, with the help of which the level in the vessel is monitored and, in particular, a calculation of the actual dosing quantity of the pump is made possible in normal operation.

During a pump ventilation, for example when the pump device is operating and the valve device is open, the level in the measuring vessel drops because the pump sucks in liquid but discharges gas via the solenoid valve. When in this operating procedure the pump ventilation in the ventilation operation is successfully completed, the amount of liquid sucked in by the pump balances the amount supplied to the measuring vessel via the valve and the line or return line. In this state, the level in the measuring vessel remains stable.

In a further embodiment, the apparatus comprises at least one temperature measuring device for detecting a temperature of at least one element of the pump device. In an embodiment, the corresponding element is the pump head and/or a piston and/or a diaphragm section of the pump device or, in general, a movable element of the pump device which is in direct contact with the medium to be pumped. Elevated temperatures (but temperatures below 45° C.) increase decomposition processes of the dimethyldicarbonate and thus the gas phase formation.

In an embodiment, the above-mentioned control device also controls the valve device taking this measured temperature into account. For example, the control device can shorten the intervals of the cyclic vent strokes and/or the intervals of the valve openings.

Embodiments of the present invention are further directed to a method for preserving beverages, wherein a flow rate of a liquid flowing through a beverage conduit is determined by means of a measuring device and a preservative and in particular dialkyl dicarbonates are conveyed into the beverage line by means of a pump device, wherein a delivery line opens into the beverage line and the pump device conveys the preservative through this beverage line and wherein the pump device is controlled in dependence on a flow rate determined by the measuring device.

According to embodiments of the invention, the pump device is vented at least temporarily by means of a venting device, wherein this venting being effected by means of a controlled valve device. It is therefore also proposed on the method side that controlled venting of the pump device takes place at least in some operating states.

In an embodiment, the pump device can be operated in different operating states. In a method, the valve device is cyclically controlled in a working mode and/or the valve device is controlled in a working mode taking into account a pumping mode of the pump device.

For example, it is possible that in a dosing operation the valve device, which is in particular a solenoid valve, is opened cyclically in order to reliably expel gas bubbles that occur during operation. In an embodiment, this opening of the valve device takes place before the subsequent dosing stroke and in a predefined period of time before this dosing stroke.

In an embodiment, this predetermined time period is less than 0.5 s, desirably less than 0.3 seconds, desirably less than 0.2 s, desirably less than 0.1 seconds, desirably less than 0.08 s, desirably less than 0.06 s, desirably less than 0.05 s, desirably less than 0.04 s, desirably less than 0.03 s, desirably less than 0.02 s.

In an embodiment, this time period is greater than 1/100 s, desirably greater than 2/100 s and desirably greater than 3/100 s.

In this way, valve actuation is possible in a depressurized state or at a low internal pump pressure. In this way, the dosing accuracy of the pump device is only slightly influenced and, on the other hand, only a small amount of force is required for the solenoid valve or for its actuation.

In addition, venting can also be carried out during production pauses in an operating mode in which production is taking place, but no pump operation is taking place that introduces the preservative into the beverage line. In this case, the valve device can be opened cyclically in order to reliably discharge any gas bubbles that arise and/or in order to dose with the required accuracy during the next pump stroke.

Furthermore, the apparatus is operated in an operating mode heating and/or is operated at least temporarily in this mode. This is in particular a waiting position before the arrival of a further batch of the beverage to be filled. In this operating mode, cyclical automatic pump strokes are triggered when a valve is open. In this operation, pump readiness is maintained despite the formation of gas bubbles in the pump head, wherein these gas bubbles are cyclically discharged in this operation.

As mentioned above, increased heat conduction towards the pump head can occur with higher temperature exposure, wherein increased temperatures increase decomposition processes and thus gas bubble formation. In an embodiment, the intervals of the cyclic venting strokes (as described above under the operating mode heating) are changed here and in particular shortened.

In an embodiment, the system control enables an operating mode venting that can be selected manually or generally by user intervention and in which the pump device is operated with an open valve in a (fixed) time interval. In this operating mode, an intensive venting or degassing process takes place.

In a further method, a gaseous and/or liquid medium discharged via the valve device is passed into a vessel and in particular a measuring vessel. In a further method, a medium discharged via the valve device is analyzed to determine whether it is a gaseous or a liquid medium.

In a further method, a temperature of at least one element of the pump device is determined at least temporarily.

BRIEF DESCRIPTION

Figure 2:
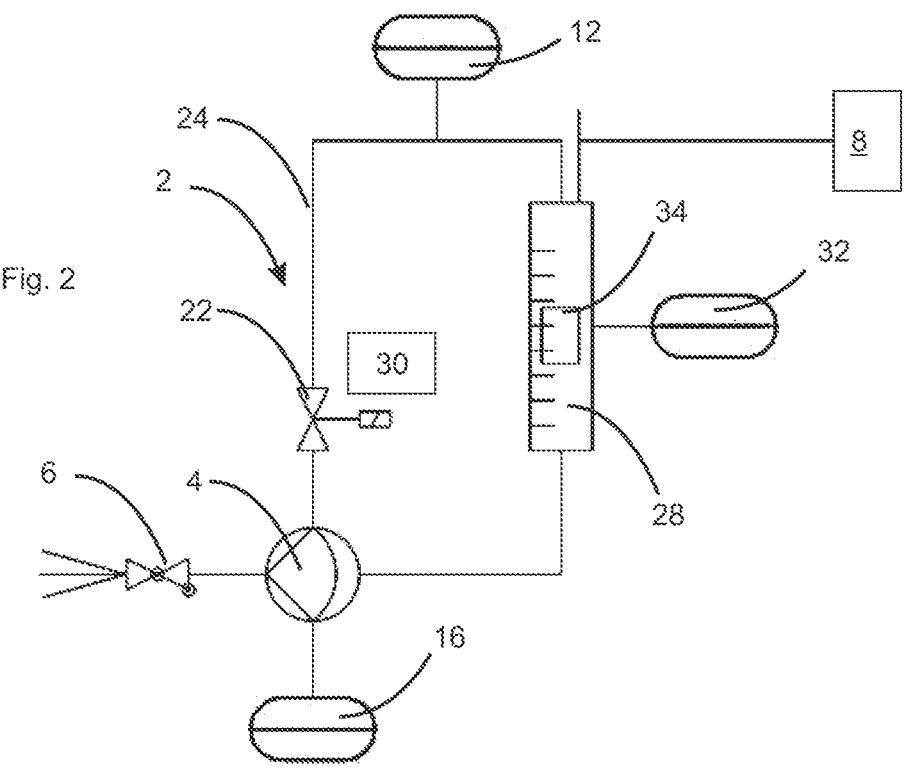

Some of the embodiments will be described in detail, with references to the following Figures, wherein like designations denote like members, wherein:

FIG. 1 shows a schematic representation of an apparatus according to embodiments of the invention; and FIG. 2 shows a detailed illustration of the venting process.

DETAILED DESCRIPTION

FIG. 1 shows an apparatus 1 for preserving beverages according to the internal conventional art of the applicant. Here, the reference sign 10 refers to a beverage line via which a liquid to be filled into containers, and in particular a beverage, is supplied to a filling machine 20. The reference sign 2 indicates a flow measuring device which determines or measures a flow of the beverage through the beverage line 20. This flow measuring device 3 outputs a control signal S to a control device 14. This control device 14 controls the pump device 4 taking this control signal S into account.

The pumping device 4 pumps a preservative from a reservoir 8 and delivers it via a nozzle head 6 into the beverage line 10, more precisely here in a curved region 10a of the beverage line 10. The reference sign 5 indicates a delivery line and the nozzle head is also a component of this delivery line 5.

FIG. 2 shows a more detailed illustration of embodiments of the invention. Here again the pump device 4 is shown, which in this case is a diaphragm pump, in particular a dosing pump.

A valve device 22 is provided at an upper area of this pump device, which is a component of the venting device designated in its entirety as 2. This valve device 22 is, as mentioned above, a solenoid valve. This solenoid valve can be controlled by a control device 30 (only shown schematically) to open and close.

A venting line 24 is connected to this solenoid valve device 22. The reference sign 3 indicates a measuring device which determines whether a gaseous or liquid medium flows in this venting line 24. In this way it can be determined whether the venting is successful or whether there is still air or gas in general in the pump device 4.

The line 24 opens into a measuring vessel 28, which has a float device 34 and a scale with which the level of the liquid in the measuring device 3 or the measuring vessel 28 can be checked.

The reference sign 32 indicates an optionally available sensor device which detects a filling level of the liquid in the measuring container. The data from this measuring device 32 is also used to control the valve device 22 and/or to control the pump device 4.

The reference sign 16 indicates an optionally available temperature measuring device which measures a temperature of at least one element of the pump device 4 and in particular a temperature in the area of the pump head. Depending on this temperature, a degassing behavior within the liquid to be dosed can also change. In an embodiment, data from this temperature measuring device 16 is therefore also used to control the valve device 22 and/or the pump device 4.

In addition, data relating to the operation of the pump device 4 itself is also used to control the valve device 22. For example, data characterizing the position of a pump element such as a pump piston or the like can be used. This data is also used to control the valve device 22. For example, it is possible that the valve device 22 is always actuated at a certain time, for example as mentioned above shortly before another pump stroke is due.

In an embodiment, dialkyl dicarbonates are used as preservatives. Very y dimethyldicarbonate is used, even more dimethyldicarbonate with a purity >99.8% is used as preservative. In a further embodiment of the invention, dimethyldicarbonate is used which has been stabilized by suitable processes.

Such methods, such as the use of a phosphorus compound from the Series Phosphorus oxides, phosphorus-oxygen acids and their derivatives are for example known from EP 2 013 160 B1. EP 2 016 041 B1 describes the use of at least one protonic acid chosen from inorganic acids and organic carboxylic acids and derivatives thereof, wherein the organic carboxylic acids 20 being saturated and mono- or polyunsaturated aliphatic monocarboxylic acids and saturated and mono- or polyunsaturated aliphatic di- and polycarboxylic acids and, in the case of derivatives thereof, hydroxamic acids, hydroxycarboxylic acids, aldehyde and keto acids, for stabilizing dialkyl dicarbonates against chemical and thermal degradation reactions, wherein the protonic acid or mixtures thereof being used in an amount of 0.01 to 100 000 ppm relative to dialkyl dicarbonates or mixtures thereof.

In a further embodiment of the invention, dimethyldicarbonate is used in a mixture with phosphorus compounds, such as phosphates, even more with trimethyl phosphate or phosphoric acid. In an embodiment, the phosphorus compound 30 is used an amount between 0.01 ppm and 1000 ppm based on the total amount of the mixture of dimethyl dicarbonate and phosphorus compounds.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS

1 apparatus
2 venting device
3 measuring device
4 pump device
5 delivery line
6 nozzle head
8 reservoir
10 beverage line
10*a* curved area
12 monitoring device
14 control device
16 temperature measuring device
20 beverage line
22 valve device
24 line/venting line
28 measuring vessel
30 control device
32 sensor device
34 float device

The invention claimed is:

1. An apparatus for preserving beverages, having a measuring device which is suitable and intended for determining a flow rate of a liquid flowing through a beverage line, and having a pump device which conveys a preservative, into the beverage line, wherein the pump device being controllable as a function of a flow rate determined by the measuring device, wherein the apparatus having a venting device for venting the pump device, wherein the venting device has a valve device, wherein a line for conducting venting gases and/or a liquid is connected to the valve device, wherein the apparatus has a measuring vessel for detecting a level of a liquid and/or gaseous medium, wherein the line for conducting the gaseous and/or liquid medium, which is connected to the valve device, opens into the measuring vessel.

2. The apparatus according to claim 1, wherein the valve device is a solenoid valve.

3. The apparatus according to claim 1, wherein the apparatus comprises a control device for controlling the valve device.

4. The apparatus according to claim 1, wherein the apparatus comprises a monitoring device for monitoring the venting process.

5. The apparatus according to claim 1, wherein the valve device can also be actuated manually and/or by user actuation.

6. The apparatus according to claim 1, wherein the valve device is arranged in a region of a pump head of the pump device and/or the valve device is arranged in a highest region of the pump device.

7. The apparatus according to claim 1, wherein the measuring vessel has an inlet for a liquid and/or an outlet for a liquid, wherein this outlet being in flow connection with the pump device.

8. The apparatus according to claim 1, wherein the apparatus comprises at least one temperature measuring device for detecting a temperature of at least one element of the pump device.

9. The apparatus according to claim 8, wherein the control device is configured to control the valve device taking this measured temperature into account.

10. The apparatus according to claim 1, wherein the valve device has a seat seal and/or the valve device is designed with a low dead space.

11. The apparatus according to claim 1, wherein the measuring vessel is designed in such a way that a gas phase can escape and a liquid phase is or can be fed again into the pump device.

12. The apparatus according to claim 1, wherein the measuring vessel has a separating device in order to be able to separate gaseous and liquids components of the venting medium via the venting valve.

13. The apparatus according to claim 12, wherein the separating device is formed by the shape of the measuring vessel itself.

14. The apparatus according to claim 1, wherein the apparatus has a sensor device that detects at least one parameter that is characteristic of the substance or media passed on from the valve device.

15. The apparatus according to claim 14, wherein the at least one parameter is characteristic whether the venting medium is a gaseous or a liquid medium.

16. The apparatus according to claim 14, wherein the sensor device is a temperature sensor, wherein this temperature sensor is kept at a suitable temperature and as soon as liquid medium is passed on from the valve device and meets the temperature sensor, the temperature of the sensor changes, wherein the temperature sensor is configured to provide a signal for the control system to detect backflowing medium.

17. The apparatus according to claim 1, wherein the measuring vessel has a discharge device for discharging a gaseous medium, wherein the discharge device has a filter device for filtering the medium to be discharged.

18. A method for preserving beverages, wherein a flow rate of a liquid flowing through a beverage line is determined by means of a measuring device and a preservative is conveyed into the beverage line by means of a pump device, wherein a delivery line opening into the beverage line and the pump device delivering the preservative through this beverage line, and wherein the pump device being controlled as a function of a flow rate determined by the measuring device, wherein the pump device is vented at least temporarily by means of a venting device, wherein this venting being carried out by means of a controlled valve device, wherein a gaseous and/or liquid medium discharged via the valve device is passed into a measuring vessel and the medium discharged via the valve device is analyzed in order to determine whether it is a gaseous or a liquid medium.

19. The method according to claim 18, wherein in a first working mode the valve device is controlled cyclically and/or in a second working mode the valve device is controlled taking into account a pumping operation of the pump device.

20. The method according to claim 18, wherein a temperature of at least one element of the pump device is determined at least temporarily.

\* \* \* \* \*